United States Patent
Kolesnichenko et al.

(10) Patent No.: US 12,109,510 B2
(45) Date of Patent: Oct. 8, 2024

(54) METHODS OF SOLVENT REMOVAL AT AMBIENT TEMPERATURES—CRYOVAP

(71) Applicant: Xavier University of Louisiana, New Orleans, LA (US)

(72) Inventors: Vladimir Kolesnichenko, New Orleans, LA (US); Galina Goloverda, New Orleans, LA (US); Igor Kolesnichenko, New Orleans, LA (US); Guangdi Wang, New Orleans, LA (US)

(73) Assignee: Xavier University of Louisiana, New Orleans, LA (US)

( * ) Notice: Subject to any disclaimer, the term of this patent is extended or adjusted under 35 U.S.C. 154(b) by 441 days.

(21) Appl. No.: 17/118,319

(22) Filed: Dec. 10, 2020

(65) Prior Publication Data
US 2021/0178287 A1    Jun. 17, 2021

Related U.S. Application Data

(60) Provisional application No. 62/946,881, filed on Dec. 11, 2019.

(51) Int. Cl.
*B01D 11/04* (2006.01)
*B01D 3/10* (2006.01)

(52) U.S. Cl.
CPC .......... *B01D 11/0492* (2013.01); *B01D 3/10* (2013.01)

(58) Field of Classification Search
CPC ........ B01D 11/04; B01D 11/0492; B01D 3/10
See application file for complete search history.

(56) References Cited

U.S. PATENT DOCUMENTS

| | | | | |
|---|---|---|---|---|
| 4,965,370 A | * | 10/1990 | Goetz | ................ C07D 207/267 548/555 |
| 5,672,631 A | | 9/1997 | Pauls et al. | |
| 2012/0289693 A1 | | 11/2012 | Coleman et al. | |

FOREIGN PATENT DOCUMENTS

| | | | | |
|---|---|---|---|---|
| CN | 2279946 Y | | 4/1998 | |
| EP | 0 433 729 B1 | * | 11/1990 | ............... B01D 3/08 |
| GB | 252190 A | * | 7/1927 | |

OTHER PUBLICATIONS

Meryman, H.T. Historical recollections of freeze-drying. Dev Biol Stand. 1976, 36, 29-32.
Genevac centrifugal evaporators [online]: spscientific.com/ProductCategory/107/Centrifugal_Evaporators_Sample_Concentrators/.
International Search Report and Written Opinion of International Patent Application No. PCT/US20/64351, mailed Mar. 9, 2021.

* cited by examiner

*Primary Examiner* — Youngsul Jeong
(74) *Attorney, Agent, or Firm* — McBee Moore & Vanik IP, LLC

(57) ABSTRACT

Disclosed are methods of solvent removal in an evacuated, closed system at ambient or low (spontaneously dropped due to evaporation endothermicity) temperature. The methods disclosed are suitable for removing the solvents with a broad range of volatility, having normal (STP) boiling points from 30 up to at least 202° C. (vapor pressures at least of 0.1 to 500 torr; higher boiling point solvents are possible to remove with longer experimental times) and is only limited from a volume standpoint by the size of the apparatus used.

19 Claims, 7 Drawing Sheets

METHODS OF SOLVENT REMOVAL AT AMBIENT TEMPERATURES—CRYOVAP

CROSS-REFERENCE TO RELATED APPLICATIONS

This Non-Provisional Patent Application claims the benefit of U.S. Provisional Patent Application No. 62/946,881, filed on 11 Dec. 2019, and which is hereby incorporated by reference in its entirety.

STATEMENT REGARDING FEDERALLY SPONSORED RESEARCH OR DEVELOPMENT

This invention was made with government NIH support under RCMI 2U54MD007595, IDeA 5 P20 GM103424-15, 3 P20 GM103424-15S1 and BUILD 5UL1GM118967, 5RL5GM118966, and 5TL4GM118968. The government has certain rights in the invention.

BACKGROUND

1. Field

The present disclosure relates to solution synthesis workup procedures, namely isolation of the heat-sensitive reaction products by solvent evaporation at an ambient or low temperature.

2. Description of Related Art

Workup procedures of many solution-based synthesis protocols commonly end with a solvent removal step. Aqueous solution-phase chemistry generates the least solvent waste and, unless the reaction product is oxygen-sensitive, water can be evaporated into the air or absorbed by a suitable desiccant. Other solvents are typically removed by evaporation, followed by collection of the condensed solvent in a receiver. Relatively small amounts of volatile solvents with vapor pressures higher than the lowest pressure that the vacuum pump is capable of providing can be evaporated at ambient temperature, with vapors condensed in a solvent trap chilled with an appropriate cryogen.[1-3] For larger volumes, rotary evaporators are commonly preferred; BÜCHI guidelines suggest a standard water bath and condenser cooling water temperature set to 50 and 10° C., respectively, while pressures are set for specific solvents, at which it's the boiling point is 30° C. ($\Delta$ 20° C. rule).[4,5] In practice, few bench chemists are comfortable with removing dimethylformamide (DMF) (B.P. 30° C. at P=4.5 torr) using a rotovap, because it is commonly paired with an oil-free diaphragm pump and such low pressure is difficult to achieve. Alternatively, raising the temperature of the heating bath usually requires using a heat-transfer liquid other than water, limits the lifetime of the seals used in the rotovap, and increases the possibility of product decomposition.

In 2000 Cherian reported the concept of high-boiling solvent removal via vacuum drying as a method developed for drug formulations.[6] In this procedure, a high boiling solvent is removed from a solution of a pharmaceutical compound by adding a low boiling co-solvent and applying vacuum at a temperature greater than the freezing point, but lower than the boiling point of the solvent mixture. The concept of vacuum evaporation under centrifugal force was realized in the Vaportec V-10 evaporator.[7] The evaporator uses a high-speed (~6000 RPM) motor to spin a vial containing a sample, creating a thin film of solvent that can be readily evaporated from the heated vial, while the consequent centrifugal force prevents "bumping." Further development on this system and inclusion of an additional external vacuum pump was attained in the Biotage® V-10 Touch, which allowed removal of higher-boiling solvents such as dimethyl sulfoxide (DMSO) and N-methyl-2-pyrrolidone (NMP).[8] A similar principle is utilized in Genevac centrifugal evaporators.[9]

High vacuum distillation, or molecular distillation, is a technique for purification of substances with low volatility, having vapor pressures of $10^{-3}$ torr or less, on a relatively small scale.[3] The apparatus is designed so that the distance from the surface of the evaporating fluid to the condenser is less than (or comparable to) the mean free path of a molecule of distillate vapor. It is imperative for molecular distillation that residual non-condensable gas pressure is maintained at very low values, which is achieved by means of a diffusion pump coupled with the freeze-pump-thaw technique [10]. High-vacuum solvent removal is often performed by distillation in a sealed system (FIG. 1) with the receiver cooled with liquid nitrogen while maintaining the temperature of another part of the apparatus with the solution being evaporated, close to ambient [10].

In some cases, reaction solvent can be removed by extracting it with another solvent, provided that the targeted solute is insoluble in it [11]. Specific processes and apparatus have been designed for biomedical and synthetic product recovery applications [12-14].

Freeze drying (lyophilizing) is a solvent evaporation technique at a temperature lower than the freezing point of the solution. In this method, a frozen solvent sublimes under conditions of dynamic vacuum and re-condenses in the condenser chamber, thus providing conditions for isolation of the solutes with no exposure to heat and with reduced residual solvent content. Freeze drier machines (lyophilizers) paired with vacuum pumps are used in this technology [15-17].

In summary, there is a variety of solvent evaporation methods relying on specialized equipment for solving specific technological tasks. In particular, removal of high boiling point solvents remains a challenge requiring high-vacuum techniques, advanced equipment, and is associated with higher costs. There is no universal technology equally efficient in different systems, thus a need for further improvement exists.

BRIEF SUMMARY OF THE INVENTION

The present disclosure teaches a simple method of solvent removal in an evacuated, closed system at ambient or low (spontaneously dropped due to evaporation endothermicity) temperature.

The main principle of the disclosed methods is the same as in the solvent transfer systems, where the solvent evaporation is driven by the pressure gradient between a first chamber (e.g., a distillation flask) and a second chamber (e.g., a receiving flask) in a closed, evacuated system containing a minimal amount of residual non-condensable gas (FIG.1) [10]. Typically, the content of residual non-condensable gas is brought to minimum by tedious freeze-pump-thaw technique and using a high-vacuum line with diffusion or turbomolecular pump. The disclosed methods help to remove the non-condensable gas by using regular oil or even diaphragm pumps and relatively brief initial pumping sessions. This can be accomplished if the pressure provided by the pump is lower than the vapor pressure of the solvent, and pumping is performed long enough so that the solvent vapor expels the non-condensable gas. Alternatively, if the solvent vapor pressure is lower than the pressure provided by the pump, a minute amount of inert co-solvent with a higher vapor pressure can be added. After initial pumping, the vacuum stopcock is closed (FIG. 1), and the system is isolated from the vacuum manifold (not shown). Once the receiver is chilled, the remaining traces of the vapor of the co-solvent condense, allowing the magnitude of the internal vacuum to reach the ambient-temperature vapor pressure of the main solvent. Since the solvent vapor pressure in the chilled receiver is lower than that in the distillation flask, a condition of mass transfer is reached and distillation takes place, provided that the surrounding medium (air or water bath) supplies thermal energy to the evaporating solution.

Co-solvents include, but are not limited to: low-polarity solvents; hydrocarbons; chlorinated hydrocarbons; polar aprotic solvents; water; and alcohols. Preferred co-solvents are chemically compatible with the target substance being recovered. Preferred co-solvents may also have low density and low miscibility with the main solvent (so that the co-solvent stays on the top of the solution to be evaporated). Preferred co-solvents include, but are not limited to: hydrocarbons such as petroleum ethers (benzines) with boiling point range 100-180° C., isooctane or decalin.

The method is suitable for removing the solvents with a broad range of volatility, having normal (STP) boiling points from 30 up to at least 202° C. (vapor pressures at least of 0.1 to 500 torr; higher boiling point solvents are possible to remove with longer experimental times) and is only limited from a volume standpoint by the size of the apparatus used. The solvents that this method could be used for include but are not limited to: water and other polar protic solvents (including, but not limited to, alcohols such as methanol, ethanol, propanol, butanol; formic acid; and acetic acid, for example); polar aprotic solvents (including, but not limited to, N-methylpyrrolidone; acetone; dimethylformamide; dimethylacetamide; acetonitrile; nitromethane; dimethyl sulfoxide; and propylene carbonate, for example); and non-polar solvents (including, but not limited to, hexane, benzene, toluene, tetralin, decalin, ethyl acetate; chloroform, 1,2-dichlorobenzene; ethers: 1,4-dioxane, tetrahydrofuran, glyme, and diglyme, for example).

Particularly preferred solvents include (but are not limited to): water, dimethylformamide (DMF); tetrahydrofuran (THF); methanol, ethyl acetate, acetone, acetonitrile, dimethyl sulfoxide (DMSO), N-methyl-2-pyrrolidone (NMP), and 1,2-dichlorobenzene.

The solvent may further comprise a corrosive component selected from the group consisting of acids (including, but not limited to, hydrohalic such as HF, HCl, HBr or HI; formic; acetic; trifluoroacetic; triflic; nitric; and aqua regia), solutions containing $NO_x$ and NOCl, acid halides ($SOCl_2$, $POCl_3$, $PCl_3$, $PBr_3$, acetyl chloride, benzoyl chloride, oxalyl chloride, ethyl chloroformate, ethyl chlorooxoacetate, methanesulfonylchloride, and triflyl chloride), silicon tetrachloride, tin tetrachloride, titanium tetrachloride, chlorine, bromine, and boron trifluoride etherate.

Furthermore, solutions containing volatile corrosive components (such as hydrogen halide) can be efficiently evaporated with minimal risk of damaging the hardware, because this method is realized in an all-glass or lined with corrosion-resisting film apparatus, without using a rotovap or any of its components, or a pump (e.g., a high-vacuum pump or oil pump) beyond an initial, relatively short evacuation stage. This method is recommended for general solution-phase synthesis routines in organic, biological, organometallic, and coordination chemistry on a basic or applied research and development scale.

Alternatively, restricting heat inflow from the surroundings to the evaporation flask, can cause spontaneous freezing of the solution being evaporated, and can provide conditions similar to freeze-drying [15-17]. Compared to commonly used techniques, such as freeze-drying, the proposed method offers better protection for heat- and air-sensitive substrates, and the benefits of more economical and shorter in time processes. A setup with the heat-insulated distillation flask can afford a relatively rapid spontaneous freezing of the diluted aqueous solutions during the initial pumping. This technique can help to recover water-free polymers and biopolymers in the form of a free-flowing fluffy solid, as compared to the liquid solution evaporation which usually results in the formation of a waxy product containing residual water.

Solutes suitable for the disclosed methods include (but are not limited to): organic substances; inorganic substances; polymers; drugs; and biological substances.

An apparatus suitable for performing the disclosed and claimed methods can be assembled in a variety of different configurations (see, for example, FIGS. 2-4) in this disclosure. The cylindrical receiver shown in FIG. 2, was originally designed by V. D. Khavruychenko in the early 1970s (National Taras Shevchenko University of Kyiv, Ukraine), however the alternative apparatuses assembled using conventional pieces of glassware (FIGS. 3 & 4) perform the same way. Although the attached drawings demonstrate apparatus configurations at laboratory scale, using glass, the skilled artisan will appreciate that these may be scaled up as necessary and materials other than glass used.

The important methodology considerations are as follows. The main principle of the described method is that the total pressure in each part of the apparatus must be equal to the vapor pressure of the solvent being distilled [10]. In a typical apparatus (FIGS. 2-4), the evacuation port is located between the distillation flask and the receiver. If during setup the flask is charged with a solution, but the receiver is empty, evacuation would cause the non-condensable gas to be expelled by the solvent vapor only from the distillation flask, but not the receiver. It is imperative that a minute amount of the same or assisting co-solvent be added to the receiver before evacuation, so that the non-condensable gas is removed from both sides of the apparatus. The amount of co-solvent (if used) can be estimated from the total volume of the apparatus; the pumping time can be determined empirically.

Absolutely essential to the success of this method is a leak-proof assembly of the apparatus. The skilled artisan will recognize that industrial volumes may be achieved with the methods described here by scaling up the apparatus to be used and by using materials (e.g., metal) suitable for the volumes and pressures required. To ensure this leak-proof condition is met, when using glass, all of the ground-glass joints and stopcock must be of the highest quality. Individually ground stopcocks (with numerically matching stopcock body and plug) and Schenk flasks with such stopcocks are available from many glass companies, and each pair of inner/outer joints should be carefully matched, or individually ground. Similarly, these joints must all be greased with great care, using high-vacuum grease (silicone or hydrocarbon-based) and making sure that each joint and stopcock are completely transparent; a rotation test of each greased joint should be smooth and show no smeared air bubbles. The same principles of leak-proof assembly pertain to performance of the claimed methods at any scale, using any materials. A leak-proof assembly could also be achieved with a dedicated apparatus that does not require connecting joints between a flask and a receiver, so long as the assembly can be charged, the product recovered, and the solvent removed (e.g., drained).

Rapid stirring of the solution being evaporated is another important aspect. An added benefit of high-RPM stirring is that it helps prevent violent solvent boiling and bumping, which is especially common during setup of the apparatus. Additionally, rapid stirring causes the surface area of the evaporating liquid to increase, which in turn, speeds up evaporation.

As a cryogen, liquid nitrogen is the most efficient, and the one to use for solvents with low vapor pressure. Preferably, a cryogenic liquid having a boiling point between −269° C. and 0° C., between −250° C. and 0° C., between −225° C. and 0° C., between −200° C. and 0° C., between −190° C. and 0° C., between −180° C. and 0° C., between −170° C. and 0° C., between −160° C. and 0° C., between −150° C. and 0° C., between −200° C. and −10° C., between −200° C. and −20° C., between −200° C. and −30° C., between −200° C. and −40° C., between −200° C. and −50° C., between −200° C. and −60° C., between −200° C. and −70° C., between −200° C. and −80° C., between −200° C. and −90° C., between −200° C. and −100° C., between −175° C. and −125° C. is used. More preferably, a cryogenic liquid having a boiling point below −150° C. (−235° F.) is used. Other suitable cryogens include, but are not limited to: crushed $CO_2$ (e.g., either in a slurry or not), ice (i.e., frozen $H_2O$), and a refrigeration apparatus (e.g., an active cooling system), for example.

Most solvents will freeze in the receiver at the temperature of liquid nitrogen, which is not a problem if a relatively small amount of solvent is to be removed. When working with larger volumes, the solvent tends to freeze in the upper part of the receiver, plugging it and hampering further evaporation. This problem can be addressed by having a Dewar flask charged with a cryogen to ¼-⅓ of its capacity, so that only the lower part of the receiver is at the temperature of the cryogen. The upper part of the receiver, which is still inside of the Dewar flask, also contributes to vapor condensation, but is less likely to accumulate frozen solvent and become clogged. As the distillation progresses, more cryogen can be added or the Dewar flask repositioned higher, so as to submerse more surface area of the receiver in cryogen (FIG. 5). A good indication that it is time to do so is when solvent begins to condense in the upper part of the receiver. If the distillation is left unattended for an extended period of time and then found unfinished, the cryogen (liquid nitrogen) should not be refilled because the liquid solvent that is likely to be present in the receiver in bulk amount, will freeze, possibly causing the receiver to burst. This is especially the case if the frozen solvent has a lower density than that of its liquid counterpart, as in the equilibrium between water and ice.

For evaporation of large volumes of relatively volatile solvents, it may be beneficial to select cryogens so as to prevent freezing of the distillate. Otherwise the vapors, primarily condensing in the top part of the receiver (close to the cryogen's upper level), often make a clog, and the lower part of the receiver remains empty through the rest of the distillation process. For water (or aqueous HCl or HBr) removal, ice appears to be the cryogen of choice (FIG. 6) because it is not cold enough to freeze the distilled solvent.

The solution being evaporated may be maintained at a temperature between about 15° C. and about 40° C., between about 20° C. and about 40° C., between about 25° C. and about 40° C., between about 15° C. and about 35° C., between about 15° C. and about 30° C., between about 15° C. and about 25° C., between about 20° C. and about 30° C., and preferably between about 22° C. and about 25° C., and more preferably at a temperature sufficient that the solution being evaporated remains liquid.

The ambient temperature may be between about 15° C. and about 40° C., between about 20° C. and about 40° C., between about 25° C. and about 40° C., between about 15° C. and about 35° C., between about 15° C. and about 30° C., between about 15° C. and about 25° C., between about 20° C. and about 30° C., and preferably between about 22° C. and about 25° C., and more preferably at a temperature sufficient that the solution being evaporated remains liquid.

In an embodiment, the solvent remaining with the solute after performing a method of the instant disclosure, is from about 0.0% to about 4.5%, about 0.0% to about 4.0%, about 0.0% to about 3.5%, about 0.0% to about 3.0%, about 0.0% to about 2.5%, about 0.0% to about 2.0%, about 0.0% to about 1.5%, about 0.0% to about 1.0%, about 0.0% to about 0.5%, about 0.1% to about 4.5%, about 0.1% to about 4.0%, about 0.1% to about 3.5%, about 0.1% to about 3.0%, about 0.1% to about 2.5%, about 0.1% to about 2.0%, about 0.1% to about 1.5%, about 0.1% to about 1.0%, about 0.1% to about 0.5%, about 0.1% to about 0.4%, about 0.1% to about 0.3%, about 0.1% to about 0.2%, about 0.01% to about 0.5%, about 0.01% to about 0.4%, about 0.01% to about 0.3%, about 0.01% to about 0.2%, about 0.01% to about 0.1%, about 0.05% to about 0.5%, about 0.05% to about 0.4%, about 0.05% to about 0.3%, about 0.05% to about 0.2%, and about 0.05% to about 0.1%.

The following further embodiments are provided:

1. A method of removing at least one solvent from a mixture comprising the at least solvent and a product, the method comprising: a) providing an apparatus comprising a first container, a second container, and a hollow tube, wherein: i) the first and second containers are fluidically connected to each other via the hollow tube; ii) the first container, second container or hollow tube further comprise a stopcock; iii) the first container contains the mixture comprising the at least one solvent and the product; and iv) the second container contains the at least one solvent alone; b) opening the stopcock and applying a vacuum to the apparatus, via the stopcock, for a time, then closing the stopcock; c) optionally warming the first container to a first temperature, for a first period; d) cooling the second container to a second temperature, for a second period; e) optionally recovering the product from the first container.

2. The method of embodiment 1, wherein the at least one solvent is selected from the group consisting of: dimethylformamide, dimethylsulfoxide, dimethylacetamide, N-methyl-2-pyrrolidone, and a solvent with a normal boiling point ranging from 150 to 210° C.

3. The method of any one of embodiments 1-2, wherein the mixture comprises at least one corrosive component selected from the group consisting of: acids (optionally hydrohalic HF, HCl, HBr or HI, formic, acetic, trifluoroacetic, triflic, nitric, and aqua regia), solutions containing $NO_x$ and NOCl, acid halides (optionally $SOCl_2$, $POCl_3$, $PCl_3$, $PBr_3$, acetyl chloride, benzoyl chloride, oxalyl chloride, ethyl chloroformate, ethyl chlorooxoacetate, methanesulfonylchloride, and triflyl chloride), silicon tetrachloride, tin tetrachloride, titanium tetrachloride, chlorine, bromine, and boron trifluoride etherate.

5. The method of embodiment 1, wherein the at least one solvent is other than an organic solvent, and the at least one solvent is compatible with organic solvent, optionally water, alcohol, or ketone.

6. The method of any one of embodiments 1-5, wherein the temperature of the evaporating solution is spontaneously lowered below freezing, and wherein the product being recovered is a polymer or a biopolymer.

7. The method of embodiment 1, wherein the at least one solvent is selected from the group consisting of: polar protic solvents; polar aprotic solvents; and non-polar solvents.

8. The method of any one of embodiments 1-8, wherein the product is selected from the group consisting of: organic substances; inorganic substances; polymers; drugs; and biological substances.

9. The method of any one of embodiments 1-8, wherein the product is a biopolymer, optionally a peptide or a protein.

10. The method of any one of embodiments 1-9, wherein the pressure within the apparatus after the stopcock is closed is between 500 torr and 0.1 torr.

11. The method of any one of embodiments 1-10, wherein the first container is at a temperature, and further wherein the pressure within the apparatus after the stopcock is closed is equal to the vapor pressure of the at least one solvent at the temperature.

12. The method of any one of embodiments 1-11, wherein the second container is cooled with a cryogen selected from the group consisting of: liquid $N_2$; dry ice (solid $CO_2$), a slurry of dry ice and a further solvent, water ice, a salt-ice mixture, and an active cooling system.

13. The method of any one of embodiments 1-12, wherein the time that the vacuum is applied is from about 1 minute to about 20 minutes.

14. The method of any one of embodiments 1-13, wherein the first container is warmed for a second period, wherein the second period is from about 1 hour to about 14 hours.

15. The method of any one of embodiments 1-14, wherein the method is performed in an environment at a temperature, and further wherein the solvent has a vapor pressure of from 0.1 to 500 torr at the temperature.

16. The method of embodiment 10, wherein total pressure in the apparatus is equal to the vapor pressure of the solvent.

17. The method of any one of embodiments 1-16, wherein the first and second chambers further contain a volatile co-solvent selected from the group consisting of: low-polarity solvents; hydrocarbons; chlorinated hydrocarbons; polar aprotic solvents; water; and alcohols.

18. The method of any one of embodiments 1-17, wherein the difference between the first temperature and the second temperature is from about 25° C. to about 225° C.

19. The method of any one of embodiments 1-18, wherein the second period is greater than the first period.

20. The method of any one of embodiments 1-19, wherein the first container comprises a stirring means, and further wherein the contents of the first container are stirred via the stirring means.

21. Use of an apparatus comprising a first container, a second container, and a hollow tube, to remove at least one solvent from a mixture comprising the at least one solvent and a product, wherein: i) the first and second containers are fluidically-connected to each other via the hollow tube; ii) the first container, second container or hollow tube further comprise a stopcock; iii) the first container contains the mixture; and iv) the second container contains the at least one solvent alone.

22. The use of embodiment 21, wherein the at least one solvent is selected from the group consisting of: dimethylformamide, dimethylsulfoxide, dimethylacetamide, N-methyl-2-pyrrolidone, and a solvent with a normal boiling point ranging from 150 to 210° C.

23. The use of any one of embodiments 21-22, wherein the mixture comprises at least one corrosive component selected from the group consisting of: acids (optionally hydrohalic HF, HCl, HBr or HI, formic, acetic, trifluoroacetic, triflic, nitric, and aqua regia), solutions containing $NO_x$ and NOCl, acid halides (optionally $SOCl_2$, $POCl_3$, $PCl_3$, $PBr_3$, acetyl chloride, benzoyl chloride, oxalyl chloride, ethyl chloroformate, ethyl chlorooxoacetate, methanesulfonylchloride, and triflyl chloride), silicon tetrachloride, tin tetrachloride, titanium tetrachloride, chlorine, bromine, and boron trifluoride etherate.

24. The use of any one of embodiments 21-23, wherein the at least one solvent is other than an organic solvent, and the at least one solvent is compatible with organic solvent, including water, alcohol, or ketone.

25. The use of any one of embodiments 21-24, wherein the product is a biopolymer, optionally a peptide or a protein.

26. The use of any one of embodiments 21-25, wherein the temperature of the evaporating solution is spontaneously lowered below freezing, and wherein the product being recovered is a polymer or a biopolymer.

27. The use of any one of embodiments 21-26, wherein the at least one solvent is selected from the group consisting of: polar protic solvents; polar aprotic solvents; and non-polar solvents.

28. The use of any one of embodiments 21-24 and 26-27, wherein the product is selected from the group consisting of: organic substances; inorganic substances; polymers; drugs; and biological substances.

29. The use of any one of embodiments 21-28, wherein the pressure within the apparatus after the stopcock is closed is between 500 torr and 0.1 torr.

30. The use of any one of embodiments 21-29, wherein the first container is at a temperature, and further wherein the pressure within the apparatus after the stopcock is closed is equal to the vapor pressure of the at least one solvent at the temperature.

31. The use of any one of embodiments 21-30, wherein the second container is cooled with a cryogen selected from the group consisting of: liquid $N_2$; dry ice (solid $CO_2$), a slurry of dry ice and a further solvent, water ice, a salt-ice mixture, and an active cooling system.

32. The use of any one of embodiments 21-31, wherein the time that the vacuum is applied is from about 1 minute to about 20 minutes.

33. The use of any one of embodiments 21-32, wherein the first container is warmed for a second period, wherein the second period is from about 1 hour to about 14 hours.

34. The use of any one of embodiments 21-33, wherein the use is performed in an environment at a temperature, and further wherein the solvent has a vapor pressure of from 0.1 to 500 torr at the temperature.

35. The use of any one of embodiments 21-34, wherein total pressure in the apparatus is equal to the vapor pressure of the solvent.

36. The use of any one of embodiments 21-35, wherein the first and second chambers further contain a volatile co-solvent selected from the group consisting of: low-polarity solvents; hydrocarbons; chlorinated hydrocarbons; polar aprotic solvents; water; and alcohols.

37. The use of any one of embodiments 21-36, wherein the difference between the first temperature and the second temperature is from about 25° C. to about 225° C.

38. The use of any one of embodiments 21-37, wherein the second period is greater than the first period.

39. The use of any one of embodiments 21-38, wherein the first container comprises a stirring means, and further wherein the contents of the first container are stirred via the stirring means.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

For further understanding of the nature, objects, and advantages of the present disclosure, reference should be had to the following detailed description, read in conjunction with the following drawings, wherein like reference numerals denote like elements.

DETAILED DESCRIPTION

Before the subject disclosure is further described, it is to be understood that the disclosure is not limited to the particular embodiments of the disclosure described below, as variations of the particular embodiments may be made and still fall within the scope of the appended claims. It is also to be understood that the terminology employed is for the purpose of describing particular embodiments, and is not intended to be limiting. Instead, the scope of the present disclosure will be established by the appended claims.

In this specification and the appended claims, the singular forms "a," "an," and "the" include plural reference unless the context clearly dictates otherwise. Unless defined otherwise, all technical and scientific terms used herein have the same meaning as commonly understood to one of ordinary skill in the art to which this disclosure belongs.

Reagents & Materials

Solvents, polyethylene glycol-1000 and benzophenone were purchased from ACROS Organics, AlfaAesar and Sigma-Aldrich and used without further purification. Schlenk and recovery flasks, and the distillation bridge were purchased from Chemglass Inc. The condenser/receiver (40) from FIG. 2 was ordered from the Chemglass Custom Glass Shop. A Leybold Trivac E2 rotary vane pump was used for evacuation of the demonstrated apparatus. NMR spectra were taken on a Bruker Fourier 300 MHz instrument in $CDCl_3$.

Figure 5:
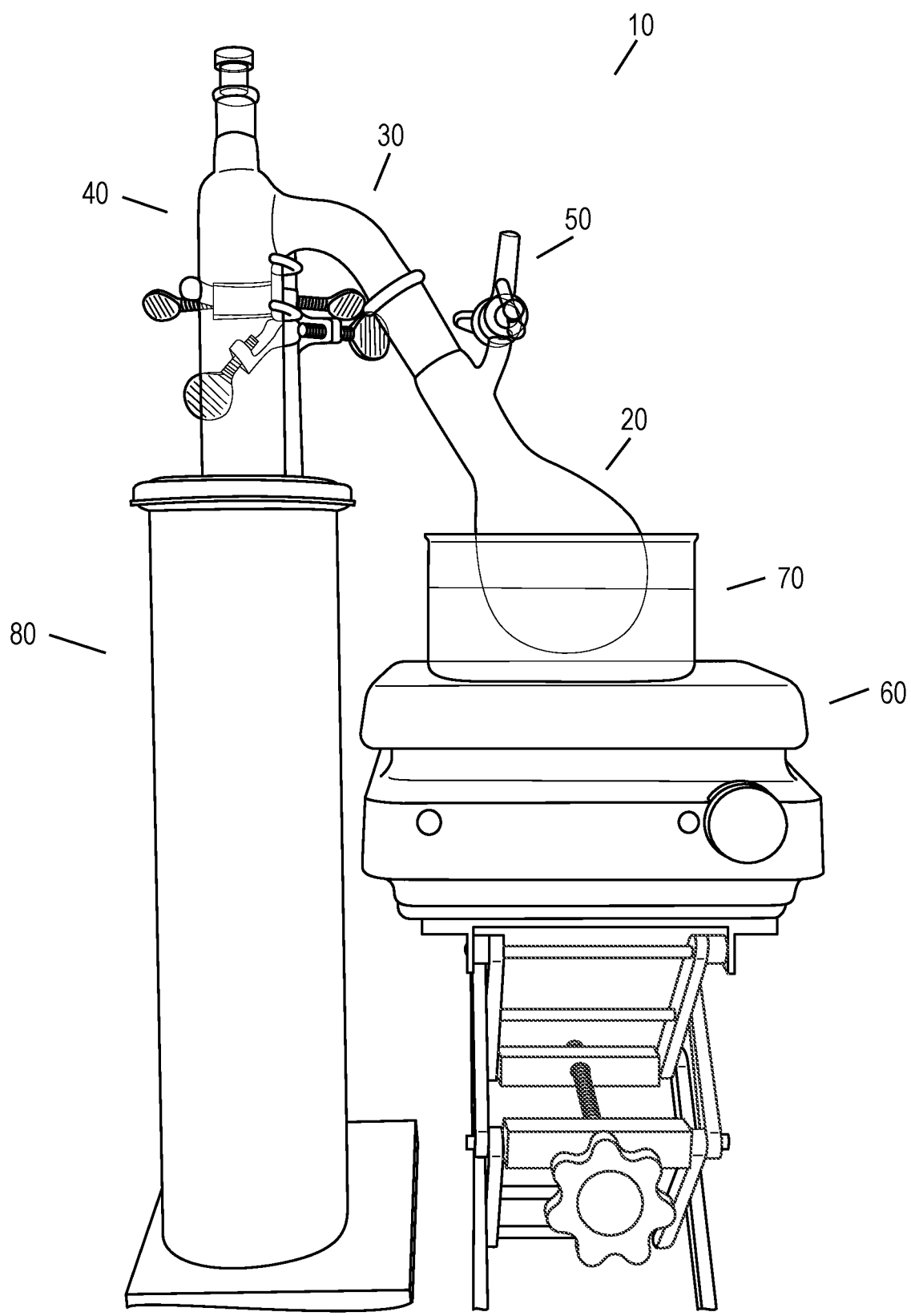
FIG. 5 shows a vacuum distillation setup with liquid nitrogen-chilled receiver.

EXAMPLE 1. A 200 mL pear-shaped Schlenk flask was charged with a 10 mm stir bar, 50 mL of DMSO, and 0.5 mL of isooctane. The receiver (40) of the apparatus (10) was charged with 0.5 mL of isooctane, carefully greased, and attached to the Schlenk flask (20) containing DMSO. As the Schlenk flask (20) was held over a working magnetic stirrer (60), the apparatus (10) was evacuated for 2-3 minutes via the stopcock (50) attached to the Schlenk flask (20). During pumping, the isooctane evaporated and its vapor expelled the residual air within the apparatus (10). The stopcock (50) was closed, and the system (10) was disconnected from the vacuum line (not shown) and arranged as shown in FIG. 5. A water bath (70) was filled with water, pre-warmed to 28° C. (to supply thermal energy for evaporation and to prevent the DMSO from freezing), and Schlenk flask (20) was partially submerged in the water bath (70). The water bath (70) was supported by a magnetic stirrer (60) which was set at high RPM. After about 5 minutes of stirring, the temperature between the water bath (70) and the solvent was assumed to have reached equilibrium. A Dewar flask (80) charged with liquid nitrogen (~⅓ of Dewar flask volume), was adjusted to a position surrounding the receiver (40) and so that only the bottom of the receiver (40) was submerged in the cryogen within the Dewar flask (80). Over the course of evaporation, the water bath (70) temperature was maintained between 27-28° C. and the receiver (40) was gradually immersed deeper into the Dewar flask (80). The solvent in the distillation flask (20) remained liquid at all times and the distillation was complete after 105 minutes (the distillation flask (20) contained no residual solvent, and was empty).

EXAMPLE 2. A 200 mL pear-shaped Schlenk flask (20) was charged with a 10 mm stir bar and 50 mL of DMF. The receiver (40) of the apparatus (10) was charged with 0.5 mL of DMF, carefully greased, and attached to the Schlenk flask (20) containing DMF. As the Schlenk flask (20) was held over a working magnetic stirrer (60), the apparatus (10) was evacuated for 4-5 minutes via the stopcock (50). During pumping, a portion of DMF evaporated and its vapor expelled the residual air within the apparatus (10). The stopcock (50) was closed, the system (10) was disconnected from the vacuum line and arranged as shown in FIG. 5. The water bath (70) was filled with ambient-temperature water (to supply thermal energy for evaporation) and the magnetic stirrer (60) was set at high RPM. A Dewar flask (80) charged with liquid nitrogen (~⅓ of its volume), was adjusted to a position so that only the bottom of the receiver (40) was submerged in the cryogen. Over the course of evaporation, the water bath (70) temperature spontaneously dropped to 17-18° C., so minimal heat was applied to maintain its temperature at ~25° C., while the receiver (40) was gradually immersed deeper into the Dewar flask (80). The distillation was complete in 90 minutes (the distillation (20) flask was empty).

EXAMPLE 3. A 200 mL pear-shaped Schlenk flask (20) was charged with a 10 mm stir bar, 50 mL of NMP, and 0.5 mL of isooctane. The receiver (40) of the apparatus (10) was charged with 0.5 mL of isooctane, carefully greased, and attached to the Schlenk flask (20) containing NMP. As the Schlenk flask (20) was held over a working magnetic stirrer (60), the apparatus (10) was evacuated for 3-4 minutes via the stopcock (50). During pumping, the isooctane evaporated and its vapor expelled the residual air within the apparatus (10). The stopcock (50) was closed, the system (10) was disconnected from the vacuum line (not shown) and arranged as shown in FIG. 5. The water bath (70) was filled with ambient-temperature water (to supply thermal energy for evaporation) and the magnetic stirrer, was set at high RPM. A Dewar flask (80) charged with liquid nitrogen (~⅓ of its volume), was adjusted to a position so that only the bottom of the receiver (40) was submerged in the cryogen. Over the course of evaporation, the water bath (70) temperature spontaneously dropped to 19° C., as the receiver (40) was gradually immersed deeper into the Dewar flask (80). The distillation was complete in 140 minutes (the distillation flask (20) was empty).

Figure 6:
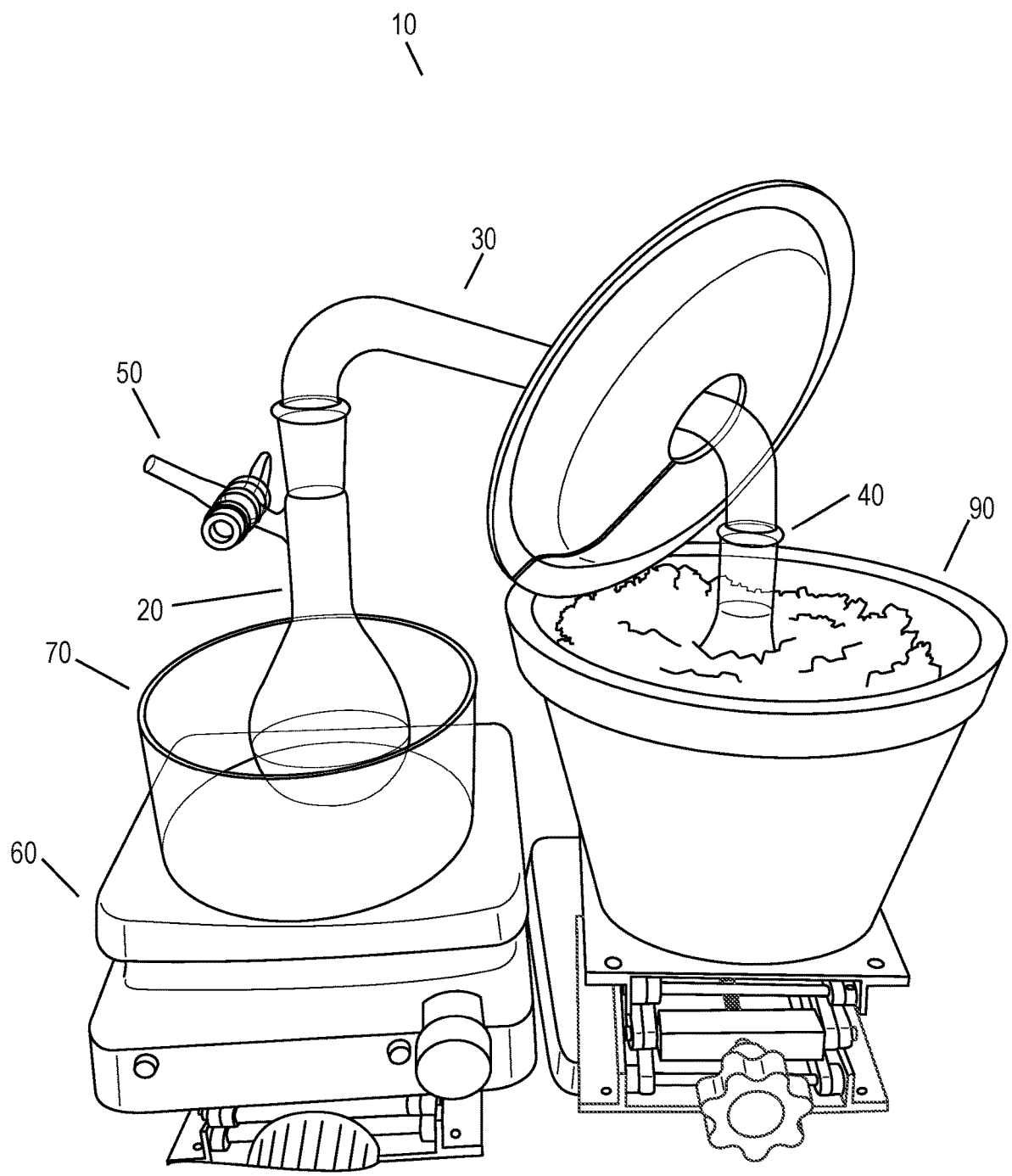
FIG. 6 shows a vacuum distillation setup with ice-chilled receiver.

EXAMPLE 4. A 200 mL pear-shaped Schlenk flask (20) was charged with a 10 mm stir bar and 50 mL of water. The round-bottomed flask receiver (40) was charged with 0.5 mL of water, carefully greased, and attached to the Schlenk flask (20) through a distillation bridge (30). As the Schlenk flask (20) with water was held over a working magnetic stirrer (60), the apparatus (10) was evacuated for 5 minutes via the stopcock (50). During pumping, a portion of water evaporated and its vapor expelled the residual air within the apparatus (10). The stopcock (50) was closed, the system (10) was disconnected from the vacuum line (not shown) and arranged as shown in FIG. 6. The water bath (70) temperature was set to 21-22° C., the magnetic stirrer (60) was set at high RPM, and the ice bucket (90) was charged with ice. The distillation was complete in 3 hours (the distillation flask (20) was empty).

EXAMPLE 5. A 100 mL pear-shaped Schlenk flask (20) was charged with a 10 mm stir bar, 1.000 g of benzophenone, 20 mL of DMSO, and 0.5 mL of isooctane. The receiver (40) of the apparatus (10) was charged with 0.5 mL of isooctane, carefully greased, and attached to the Schlenk flask (20) containing the benzophenone solution. The system (10) was evacuated for ~2 minutes via the stopcock (50), disconnected from the vacuum line (not shown), and arranged as shown in FIG. 5. The water bath (70) was filled with ambient-temperature water and the magnetic stirrer (60), was set at high RPM. A Dewar flask (80) charged with liquid nitrogen (~⅓ of its volume), was adjusted to a position so that only the bottom of the receiver (40) was submerged in the cryogen. Over the course of evaporation, the water bath (70) temperature spontaneously dropped to 22° C., and it was readjusted to 25-26° C. Most of the solvent evaporated in ~50 minutes, but the experiment was continued for additional 35 minutes. Gravimetric control showed that 12% of the benzophenone sample evaporated. The recovered benzophenone contained no residual solvent as determined by $^1$H NMR and had a melting point range of 47-47.5° C.

EXAMPLE 6. A 100 mL pear-shaped Schlenk flask (20) was charged with a 10 mm stir bar, 1.000 g of benzophenone, 20 mL of NMP, and 0.5 mL of isooctane. The receiver (40) of the apparatus (10) was charged with 0.5 mL of isooctane, carefully greased, and attached to the Schlenk flask (20) containing the benzophenone solution. The system (10) was evacuated for ~2 minutes via the stopcock (50), disconnected from the vacuum line (not shown) and arranged as shown in FIG. 5. The water bath (70) was filled with ambient-temperature water and the magnetic stirrer, was set at high RPM. A Dewar flask (80) charged with liquid nitrogen (~⅓ of its volume), was adjusted to a position so that only the bottom of the receiver (40) was submerged in the cryogen. Over the course of evaporation, the water bath (70) temperature was maintained at 24-26° C. Most of the solvent evaporated in ~50 minutes, but the experiment was continued for additional 35 minutes. The recovered benzophenone sample contained 4 mol % of residual solvent by $^1$H NMR (2.2 wt %) and had a melting point range of 41-45° C.

Figure 7:
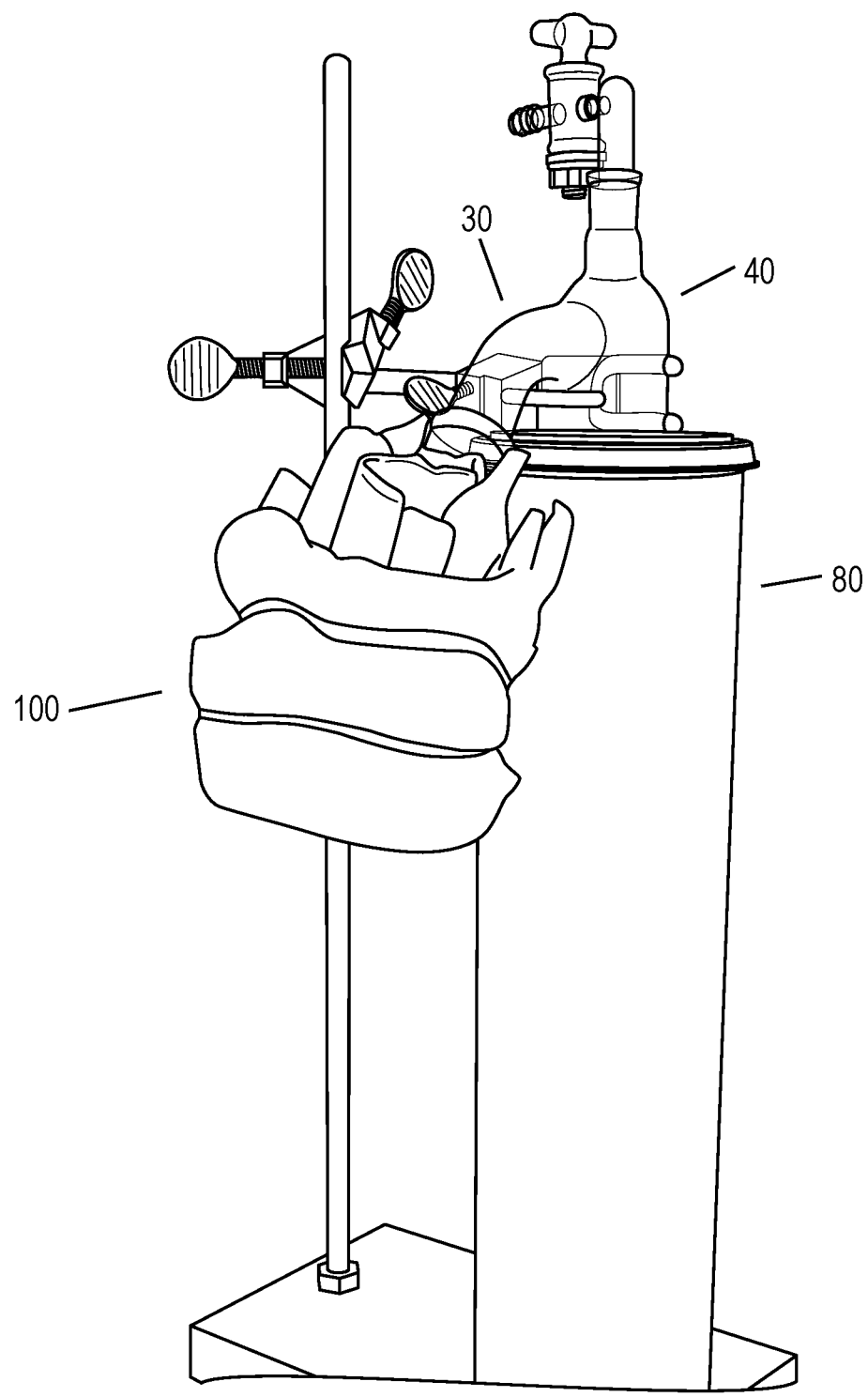
FIG. 7 shows a vacuum freeze-drying setup.

EXAMPLE 7. A 100 mL pear-shaped recovery flask (20) was charged with a 10 mm stir bar, 690 mg of polyethylene glycol 1000 and 10 mL of water. The receiver (40) of the apparatus (10) was charged with 0.5 mL of water, carefully greased, and attached to the distillation flask (20) containing the polyethylene glycol solution. A K-type thermocouple (not shown) was taped to the flask (20) bottom, the flask (20) was wrapped by heat-insulating blanket (100), the magnetic stirrer (60), was set at high RPM and the system (10) was evacuated for 15 minutes. By the end of pumping, the entire solution was frozen. The evacuation stopcock (50) was closed, the system (10) was disconnected from the vacuum line (not shown), and assembled as shown in FIG. 7. A Dewar flask (80) charged with liquid nitrogen (~¾ of its volume), was adjusted to a position so that most of the receiver (40) was submerged in the cryogen. The lowest temperature of the outside bottom surface of the flask (20) was measured to be −17° C.

Figure 1:
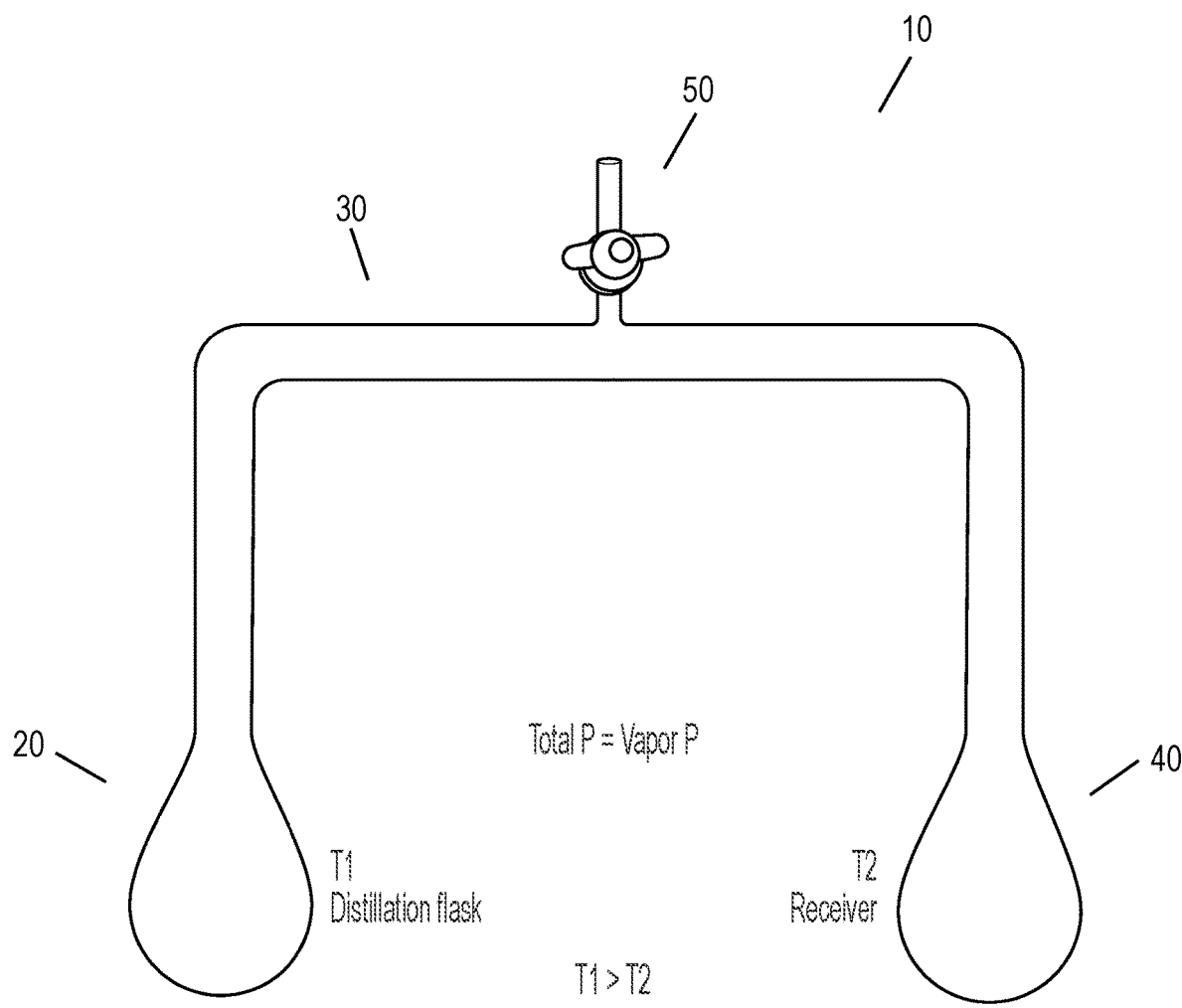
FIG. 1 shows the scheme of ambient or low-temperature vacuum distillation setup.
Figure 2:
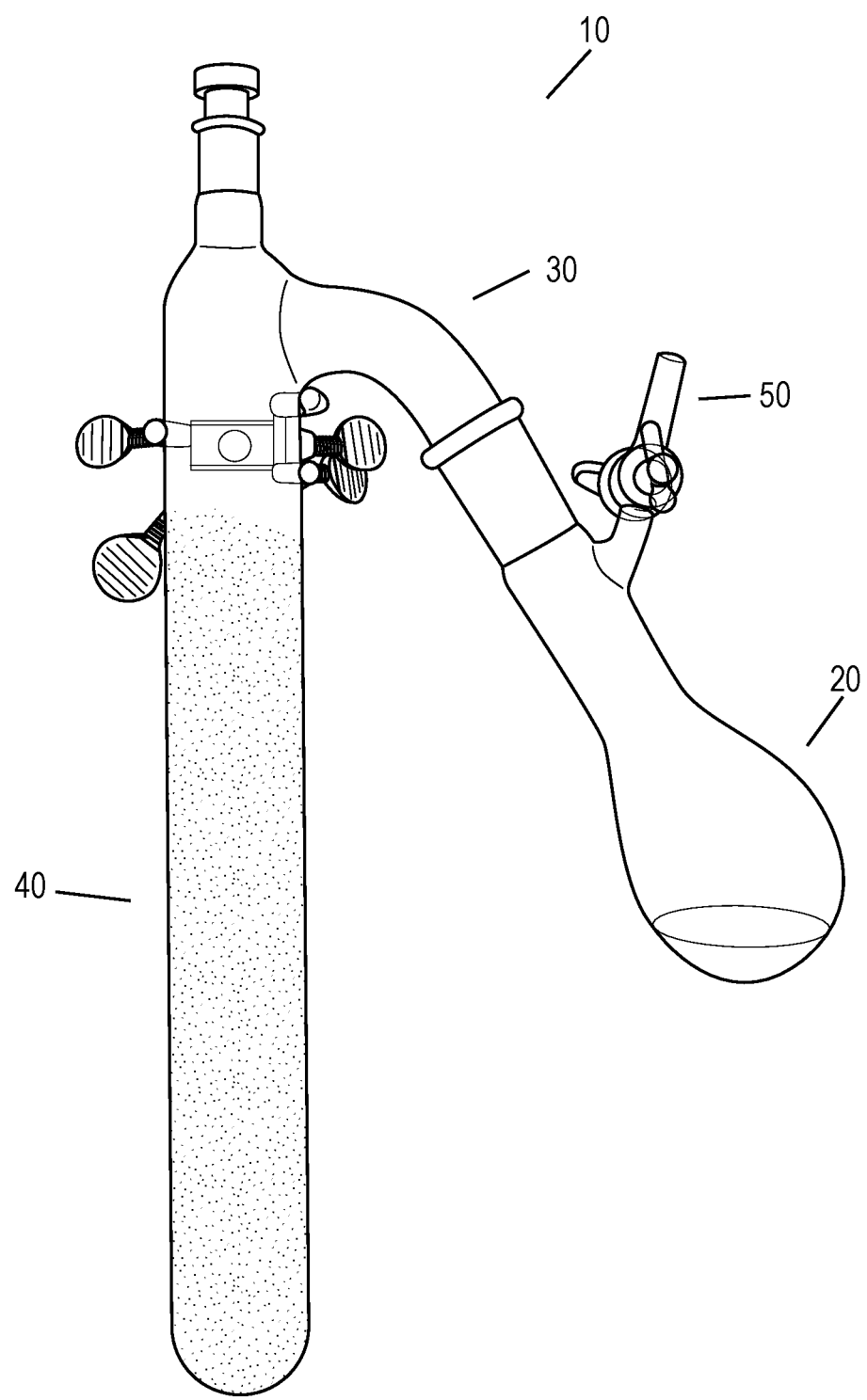
FIG. 2 shows a vacuum distillation apparatus with an air-free Schlenk distillation flask and a cylindrical receiver (which is shown as filled with frozen solvent).
Figure 3:
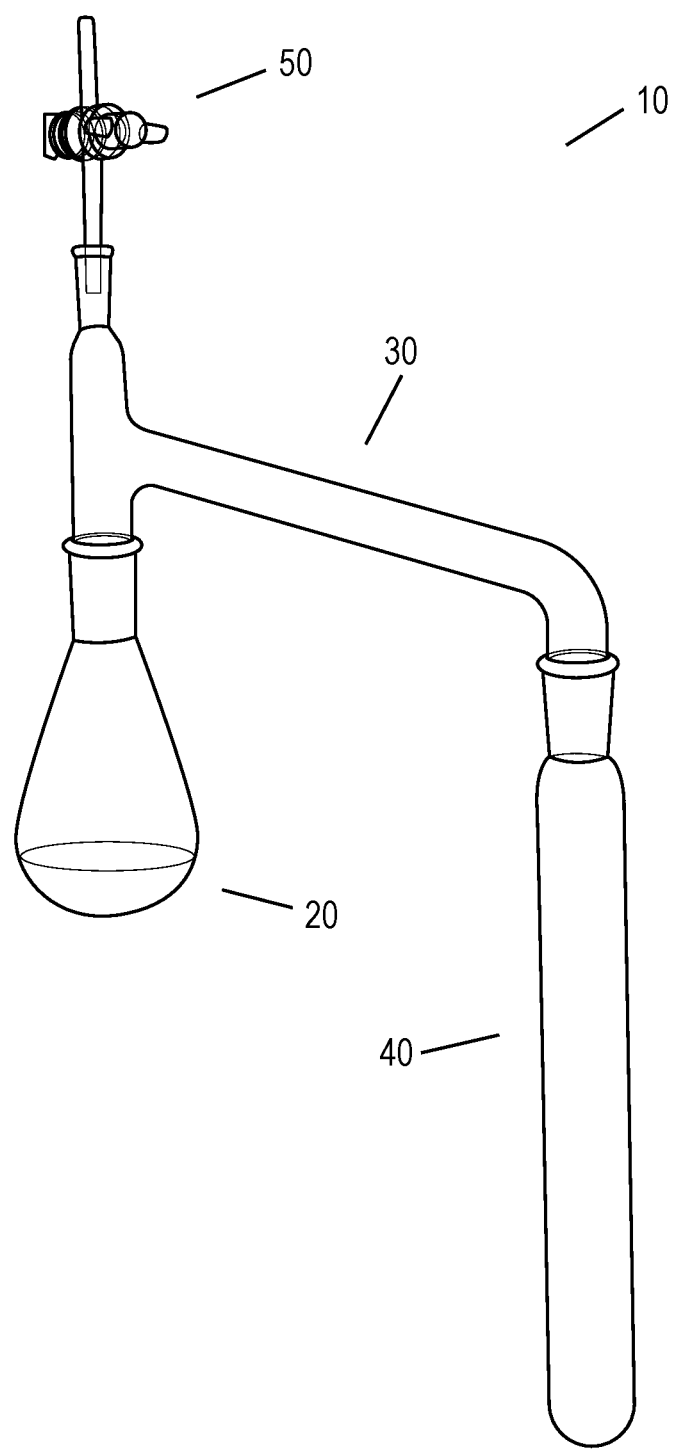
FIG. 3 shows a vacuum distillation apparatus useful for the claimed methods.
Figure 4:
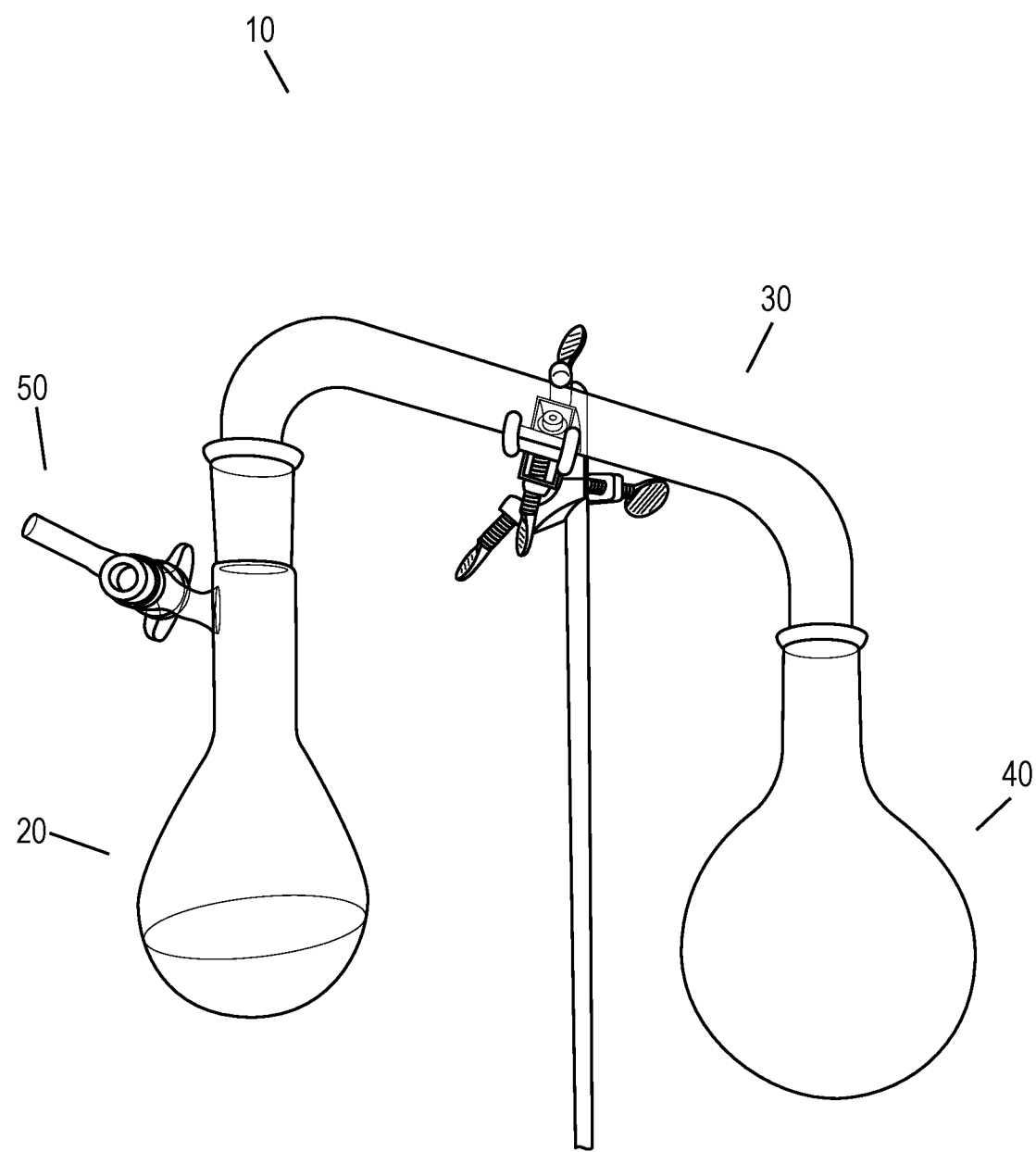
FIG. 4 shows a vacuum distillation apparatus with a Schlenk distillation flask and a bridge-connected receiver.

After 7 hours the system (10) was taken apart and the gravimetric control showed 1.45% sample weight depression (final mass was 10 mg lower than initial) which is most likely attributed to water being present in the original sample. The recovered polymer had a fluffy texture. In the control experiment, the same sample was re-dissolved in 10 mL of water and freeze-dried under the same conditions. The sample weight depression was found 0.29%, the number which borders with the accuracy limitation of this method. Thus, in the control test performed with the same polymer at ambient temperature (i.e., as shown in FIG. 2) the water evaporation was incomplete even after an extended period of 14 hours (5% to 7% of water remained), and the polymer was recovered in the form of a waxy mass. In contrast, when water was removed from the polymer via the methods of the instant disclosure, polymer was recovered as a fluffy-textured solid with 0.07-0.2% water.

All references cited in this specification are herein incorporated by reference as though each reference was specifically and individually indicated to be incorporated by reference. The citation of any reference is for its disclosure prior to the filing date and should not be construed as an admission that the present disclosure is not entitled to antedate such reference by virtue of prior invention.

It will be understood that each of the elements described above, or two or more together may also find a useful application in other types of methods differing from the type described above. Without further analysis, the foregoing will so fully reveal the gist of the present disclosure that others can, by applying current knowledge, readily adapt it for various applications without omitting features that, from the standpoint of prior art, fairly constitute essential characteristics of the generic or specific aspects of this disclosure set forth in the appended claims. The foregoing embodiments are presented by way of example only; the scope of the present disclosure is to be limited only by the following claims.

REFERENCES CITED

1. Leonard, J., Lygo, B., Procter, G. Advanced Practical Organic Chemistry; CRC Press: Boca Raton, 2013; pp. 218-227.
2. Armarego, W. L. F. Purification of Laboratory Chemicals; BH/Elsevier: Oxford/Cambridge, 2017; pp. 8-15.
3. Furnis, B. S.; Hannaford, A. J.; Smith, P. W. G.; Tatchell A. R. Vogel's Textbook of Practical Organic Chemistry; Longman Scientific & Technical: Harlow Essex, 1989; pp. 169-190.
4. The Laboratory Assistant [Online]; buchi.com/en/applications/literature
5. BÜCHI list of solvents [Online]; buchi.com/en/products/laboratory-evaporation/interface-i-100

6. Cherian, M. Method for removing high boiling solvents from drug formulations by vacuum drying. U.S. Pat. No. 6,045,808A, Apr. 4, 2000.
7. Benali, O., Davies, G., Deal, M., Farrant, E., Guthrie, D., Holden, J., Wheeler, R. J. Fully Automated Open Access Platform for Rapid, Combined Serial Evaporation and Sample Reformatting. Comb. Chem. 2008, 10, 52-55.
8. Biotage V-10 Touch [online]: biotage.com/product-page/biotage-v-10-touch
9. Genevac centrifugal evaporators [online]: spscientific.com/ProductCategory/107/Centrifugal_Evaporators_Sample_Concentrators/
10. Errington, R. J. Advanced Practical Inorganic and Metalorganic Chemistry; Blackie Academic & Professional: London/Weinheim/New York/Tokyo/Melbourne/Madras, 1997; chapters 5 and 8.
11. Delhaye, Laurent; Ceccato, A.; Jacobs, P.; Köttgen, C.; Merschaert, A. Removal of reaction solvent by extractive workup: Survey of water and solvent co-extraction in various systems. Organic Process Research & Development, 2007, 11.1, 160-164.
12. Wills, R. A. Process For Removing Residual Solvent From Solids. U.S. Pat. No. 6,509,051 B1, Jan. 21, 2003.
13. Mizushima, Y.; Sakamaki, S. Removing Method and Apparatus for High-melting Point Compound, Solvent Recovering Method and Solvent Recovering Apparatus. U.S. Pat. No. 7,905,944 B2. Mar. 15, 2011.
14. Bomberger, D. C.; Chavez, B.; Garcia, P. E.; Hegwer, E.; Low, T. P.; Malhotra, R.; Shimon, J. J. Systems and Methods Using a Solvent for the Removal of Lipids from Fluids. US patent US 2006/0060520 A1, Mar. 23, 2006.
15. Meryman, H. T. Principles of Freeze-drying, Annals of the New York Academy of Sciences, 1960, 85, 630-640. doi: 10.1111/j.1749-6632.1960.tb49987.x.
16. Freeze drying/lyophilization of pharmaceutical and biological products. Rey, L.; May, J. C. (3rd ed.). New York: Informa Healthcare, 2010.
17. Corver, J. The Evolution of Freeze-Drying, Innovations in Pharmaceutical Technology, 2009, 29, 66-70.

What is claimed is:

1. A method of removing at least one solvent from a mixture comprising the at least one solvent and a product, the method comprising:
   a) providing an apparatus comprising a first container, a second container, and a hollow tube, wherein:
      i) the first and second containers are fluidically connected to each other via the hollow tube;
      ii) the first container, second container or hollow tube further comprise a stopcock;
      iii) the first container contains the mixture comprising the at least one solvent and the product, wherein the at least one solvent is high-boiling solvent, and the mixture is maintained at an ambient temperature; and
      iv) the second container contains the at least one solvent alone;
   b) adding a volatile co-solvent to the first container and the second container;
   c) opening the stopcock and applying a vacuum via a vacuum pump to the apparatus, via the stopcock, for a time, then closing the stopcock, wherein a vapor pressure of the volatile co-solvent is higher than a pressure provided by the vacuum pump;
   d) optionally warming the first container to a first temperature, for a first period;
   e) cooling the second container to a second temperature, for a second period; and
   f) recovering the product from the first container and the at least one solvent from the second container,
      wherein the volatile co-solvent is selected from the group consisting of:
   hydrocarbons; chlorinated hydrocarbons; polar aprotic solvents; water; and alcohols.

2. The method of claim 1, wherein the at least one solvent is selected from the group consisting of: dimethylformamide, dimethylsulfoxide, dimethylacetamide, N-methyl-2-pyrrolidone, and a solvent with a normal boiling point ranging from 150 to 210° C.

3. The method of claim 1, wherein the mixture comprises at least one corrosive component selected from the group consisting of: acids comprising hydrohalic HF, HCl, HBr or HI, formic acid, acetic acid, trifluoroacetic acid, triflic acid, nitric acid, and aqua regia, solutions containing $NO_x$ and NOCl, acid halides comprising $SOCl_2$, $POCl_3$, $PCl_3$, $PBr_3$, acetyl chloride, benzoyl chloride, oxalyl chloride, ethyl chloroformate, ethyl chlorooxoacetate, methanesulfonylchloride, and triflyl chloride, silicon tetrachloride, tin tetrachloride, titanium tetrachloride, chlorine, bromine, and boron trifluoride etherate.

4. The method of claim 1, wherein the at least one solvent is other than an organic solvent, and the at least one solvent is compatible with organic solvent, optionally water, alcohol, or ketone.

5. The method of claim 1, wherein the temperature of the mixture is spontaneously lowered below freezing, and wherein the product being recovered is a polymer or a biopolymer.

6. The method of claim 1, wherein the at least one solvent is selected from the group consisting of: polar protic solvents; polar aprotic solvents; and non-polar solvents.

7. The method of claim 1, wherein the product is selected from the group consisting of: organic substances; inorganic substances; polymers; drugs; and biological substances.

8. The method of claim 1, wherein the product is a peptide or a protein.

9. The method of claim 1, wherein the pressure within the apparatus after the stopcock is closed is between 0.1 torr and 500 torr.

10. The method of claim 1, wherein the first container is at a temperature, and further wherein the pressure within the apparatus after the stopcock is closed is equal to the vapor pressure of the at least one solvent at the temperature.

11. The method of claim 1, wherein the second container is cooled with a cryogen selected from the group consisting of: liquid $N_2$, dry ice, a slurry of dry ice and a further solvent, water ice, a salt-ice mixture, and an active cooling system.

12. The method of claim 1, wherein the time that the vacuum is applied is from about 1 minute to about 20 minutes.

13. The method of claim 1, wherein the first container is warmed for a second period, wherein the second period is from about 1 hour to about 14 hours.

14. The method of claim 1, wherein the method is performed in an environment at a temperature, and further wherein the solvent has a vapor pressure of from 0.1 torr to 500 torr at the temperature.

15. The method of claim 9, wherein total pressure in the apparatus is equal to the vapor pressure of the solvent.

16. The method of claim 1, wherein the difference between the first temperature and the second temperature is from about 25° C. to about 225° C.

17. The method of claim 1, wherein the second period is greater than the first period.

18. The method of claim 1, wherein the first container comprises a stirring means, and further wherein the mixture of the first container are stirred via the stirring means.

19. The method of claim 1, wherein the at least one solvent and the volatile co-solvent are evaporated without using a high-vacuum pump, the volatile co-solvent is chemically compatible with the product, and the volatile co-solvent has low density than the at least one solvent and low miscibility with the at least one solvent so that the volatile co-solvent stays on the top of solution to be evaporated.

* * * * *